United States Patent
Cantley et al.

(10) Patent No.: US 9,342,755 B2
(45) Date of Patent: *May 17, 2016

(54) IMAGE OVERLAY FOR DUPLICATE IMAGE DETECTION

(71) Applicant: BANK OF AMERICA CORPORATION, Charlotte, NC (US)

(72) Inventors: Kerry M. Cantley, Fort Mill, SC (US); John W. DeZervos, Mooresville, NC (US); Erin Cassell, Charlotte, NC (US); John J. Towey, Jr., Farmingdale, NJ (US); Lori G. Noesges, West Chicago, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,177

(22) Filed: Dec. 21, 2015

(65) Prior Publication Data

US 2016/0110629 A1    Apr. 21, 2016

Related U.S. Application Data

(63) Continuation of application No. 13/903,493, filed on May 28, 2013, now Pat. No. 9,218,701.

(51) Int. Cl.
*G06K 9/00* (2006.01)
*G06K 9/62* (2006.01)
(Continued)

(52) U.S. Cl.
CPC ............ *G06K 9/6201* (2013.01); *G06Q 20/108* (2013.01); *G06Q 40/00* (2013.01); *G07D 7/2058* (2013.01); *G07D 7/2066* (2013.01); *G06K 9/00442* (2013.01); *G06K 2009/6213* (2013.01);
(Continued)

(58) Field of Classification Search
CPC ... G06Q 20/0425; G06Q 20/10; G06Q 40/02; G06Q 40/12; G06K 2009/6213; G06K 9/00442; G06T 7/001; G06T 2207/20021
See application file for complete search history.

(56) References Cited

U.S. PATENT DOCUMENTS 5,668,897 A * 9/1997 Stolfo ............... G06F 17/30247
382/283
6,553,136 B1 * 4/2003 Keshet ................. G06K 9/4609
382/135
(Continued)

OTHER PUBLICATIONS

Koicz, Aleksander, Abdur Chowdhury, and Joshua Alspector. "Improved robustness of signature-based near-replica detection via lexicon randomization." Proceedings of the tenth ACM SIGKDD international conference on Knowledge discovery and data mining. ACM, 2004.*

(Continued)

*Primary Examiner* — Stephen R Koziol
*Assistant Examiner* — Jonathan S Lee
(74) *Attorney, Agent, or Firm* — Michael A. Springs; Moore & Van Allen PLLC; W. Kevin Ransom

(57) ABSTRACT

Embodiment for detecting duplicate images include systems for determining that two or more of the images have similar key attributes such as attributes related to certain data in the images or image quality. Further, the embodiments include superimposing at least a portion of a first image of the two or more images over at least a portion of the second image of the two or more images, comparing the first image and second image; and determining whether the first image and the second image are identical.

7 Claims, 10 Drawing Sheets

(51) Int. Cl.
*G07D 7/20* (2016.01)
*G06Q 40/00* (2012.01)
*G06Q 20/10* (2012.01)
*G06T 7/00* (2006.01)
*G06Q 20/04* (2012.01)

(52) U.S. Cl.
CPC ............ *G06Q 20/0425* (2013.01); *G06Q 20/10* (2013.01); *G06T 7/001* (2013.01); *G06T 2207/20021* (2013.01)

(56) References Cited

U.S. PATENT DOCUMENTS

| | | | | |
|---|---|---|---|---|
| 7,602,971 | B2* | 10/2009 | Yeh | G06K 9/00449 |
| | | | | 382/176 |
| 8,015,162 | B2* | 9/2011 | Henzinger | G06F 17/3089 |
| | | | | 707/692 |
| 8,260,006 | B1* | 9/2012 | Callari | G06K 9/00973 |
| | | | | 345/619 |
| 8,351,678 | B1* | 1/2013 | Medina, III | G06Q 20/00 |
| | | | | 235/379 |
| 8,433,123 | B1* | 4/2013 | Csulits | G07F 19/20 |
| | | | | 209/534 |
| 8,548,220 | B2* | 10/2013 | Bang | G07D 7/122 |
| | | | | 382/100 |
| 8,688,579 | B1* | 4/2014 | Ethington | G06Q 40/02 |
| | | | | 705/35 |
| 9,111,183 | B2* | 8/2015 | Moon | G06K 9/78 |
| 2001/0035870 | A1* | 11/2001 | Takeuchi | G09G 5/393 |
| | | | | 345/630 |
| 2002/0097903 | A1* | 7/2002 | Prakash | G06K 19/06009 |
| | | | | 382/137 |
| 2003/0172030 | A1* | 9/2003 | Volgunin | G06Q 20/04 |
| | | | | 705/42 |
| 2003/0172066 | A1* | 9/2003 | Cooper | G06F 17/3061 |
| 2004/0247168 | A1* | 12/2004 | Pintsov | G06K 9/2054 |
| | | | | 382/137 |
| 2007/0156438 | A1* | 7/2007 | Popadic | G06Q 20/0425 |
| | | | | 229/71 |
| 2008/0103790 | A1* | 5/2008 | Abernethy | G06Q 30/018 |
| | | | | 705/317 |
| 2009/0285471 | A1* | 11/2009 | Wall | G06K 9/00986 |
| | | | | 382/137 |
| 2010/0033501 | A1* | 2/2010 | Whitesell | G06T 7/0024 |
| | | | | 345/634 |
| 2010/0098318 | A1* | 4/2010 | Anderson | G06K 9/186 |
| | | | | 382/137 |
| 2011/0029491 | A1* | 2/2011 | Joshi | G06F 17/30675 |
| | | | | 707/692 |
| 2011/0276874 | A1* | 11/2011 | Dejean | G06F 17/243 |
| | | | | 715/243 |
| 2013/0148874 | A1* | 6/2013 | Jones | G06Q 20/042 |
| | | | | 382/135 |
| 2015/0117749 | A1* | 4/2015 | Smith | G06K 9/00483 |
| | | | | 382/137 |

OTHER PUBLICATIONS

Tan, Hung-Khoon, Chong-Wah Ngo, and Tat-Seng Chua. "Efficient mining of multiple partial near-duplicate alignments by temporal network." Circuits and Systems for Video Technology, IEEE Transactions on 20.11 (2010): 1486-1498.*

Garain, Utpal, and Biswajit Halder. "On automatic authenticity verification of printed security documents." Computer Vision, Graphics & Image Processing, 2008. ICVGIP'08. Sixth Indian Conference on . IEEE, 2008.

Kolcz, Aleksander, Abdur Chowdhury, and Joshua Alspector. "Improved robustness of signature-based near-replica detection via lexicon randomization." Proceedings of the tenth ACM SIGKDD international conference on knowledge liscovery and data mining, ACM, 2004.

Tan, Hung-khoon, Chong-Wah Ngo and Tat-Seng Chua. "Efficient mining of multiple partial near-duplicate alignments by temporal network." Circuits and Systems for Video Technology, IEEE Transactions on 20. 11 (2010); 1486-1498.

* cited by examiner

FIG. 7

My Name
My Address

PAY TO THE
ORDER OF ___Individual/Organization___ Date ___MM/DD/YYYY___

___XX XX-XX and xx/100___ $ [ $XXX.xx ]

___Individual/Organization___ DOLLARS

My Bank
My Bank's Address

MEMO _XXXXXXX_ SIGNATURE ___My Name___

⑆XXXXXXXX ⑈ XXXXXXXX ⑈¹

My Name
My Address xxxx

Date XX/XX/XXXX

PAY TO THE
ORDER OF ___𝕴𝖓𝖉𝖎𝖛𝖎𝖉𝖚𝖆𝖑/𝕺rganization___  $ |￠XXX.xx|

XX XX-XX and xx/100 _____ DOLLARS

My Bank
My Bank's Address

MEMO ___XXXXXXX___  _____ My Name
                         SIGNATURE

|: XXXXXXXXX |: XXXXXXXXX *|

910 (check outline)
920 → (arrow to "Individual/Organization")
930 (black circle near signature)

*FIG. 9*

My Name
My Address xxxx

PAY TO THE
ORDER OF   Individual/Organization

Date XX/XX/XXXX $ $XX.XX

XX XX-XX and xx/100                              DOLLARS

My Bank
My Bank's Address

MEMO   XXXXXXX          SIGNATURE   My Name

I: XXXXXXXXX I:   XXXXXXXXXX "I

IMAGE OVERLAY FOR DUPLICATE IMAGE DETECTION

CROSS-REFERENCE TO RELATED APPLICATIONS

This application is a continuation of U.S. patent application Ser. No. 13/903,493, filed May 28, 2013 of the same title and issuing as U.S. Pat. No. 9,218,701 on Dec. 22, 2015; the contents of which are hereby incorporated by reference.

BACKGROUND

Certain businesses often receive large quantities of images for archiving, processing, and analyzing. These businesses may be required to save these images for a certain period of time and may be further required to process the records or data contained in the images in accordance with certain guidelines. Due to the varied period of time that the image records are stored, the many different types of records received by the businesses, and the large volume of records, organizing and analyzing the image records can be difficult. Further still, in some instances businesses may receive the same or similar images from a wide variety of entities, and determining which images must be processed and retained and which images may be discarded can present even more difficulties.

BRIEF SUMMARY

The embodiments provided herein are directed to a system for detecting duplicate images. In some embodiments, the system includes a computer apparatus including a processor and a memory; and a duplicate detection software module stored in the memory, comprising executable instructions that when executed by the processor cause the processor to receive multiple check images. In some embodiments, the executable instruction further cause the processer to determine that two or more of the images have similar key attributes. In some embodiments, the executable instructions further cause the processer to superimpose at least a portion of a first image of the two or more images over at least a portion of the second image of the two or more images. In some embodiments, the executable instructions further cause the processer to compare the first image and second image. In some embodiments, the executable instructions further cause the processer to determine whether the first image and the second image are identical based on the comparison.

In other embodiments of the systems, the executable instructions further cause the processor to: determine that the first image and the second image are identical and discard at least one of the images based on one or more sources of the first image and the second image, image quality of the first image and the second image, or receipt date of the first image and the second image. In still other embodiments, the executable instructions further cause the processor to determine that the first image and the second image are not identical and store the first image and the second image in a storage device for further processing. In additional embodiments, the executable instructions further cause the processor to identify the differences between the first image and the second image, the differences comprising markings. In further embodiments, the executable instructions further cause the processor to determine that the portion of the first image and the portion of the second image are positioned in different and separate areas of each of the checks, wherein the markings are identical.

In additional embodiments of the system, the executable instructions further cause the processor to determine that the portion of the first image and the portion of the second image are positioned in the same areas of each of the checks, wherein the markings are different. In other embodiments, the first image and the second image comprise financial records. In still other embodiments, the executable instructions further cause the processor to request input from a financial account holder associated with the at least one of the two or more images. In some embodiments, the key attributes comprise check numbers, amounts, payors, payees, dates of the financial records, routing numbers, or account numbers. In further embodiments, the transparency level of the first check image is different from the transparency level of the second check image. In some embodiments, the executable instructions further cause the processor to superimpose data of the first image or data of the second image on a template.

Also provided herein, are embodiments directed to a computer program product for detecting duplicate images. In some embodiments, the computer program product includes a computer readable storage medium having computer readable program code embodied therewith. In some embodiments, the computer readable program code includes computer readable program code is configured to receive multiple images. In some embodiments, the computer readable program code includes computer readable program code configured to determine that two or more of the images have similar key attributes. In some embodiments, the computer readable program code includes computer readable program code configured to superimpose at least a portion of a first image of the two or more images over at least a portion of the second image of the two or more images. In some embodiments, the computer readable program code includes computer readable program code configured to compare the first image and second image. In some embodiments, the computer readable program code includes computer readable program code configured to determine whether the first image and the second image are identical based on the comparison.

In some embodiments of the computer program product, the first image and the second image comprise financial records. In other embodiments, the key attributes comprise check numbers, amounts, payors, payees, dates of the financial records, routing numbers, or account numbers. In still other embodiments, the computer readable program code includes computer readable program code configured to determine that the first image and the second image are not identical and store the first image and the second image in a storage device for further processing. In additional embodiments, the computer readable program code includes computer readable program code configured to determine that the first image and the second image are identical and discard at least one of the images based on one or more sources of the first image and the second image, image quality of the first image and the second image, or receipt date of the first image and the second image.

Further provided herein are embodiments directed to computer-implemented methods for detecting duplicate images. In some embodiments, the methods include receiving, at a computing device, multiple images. In some embodiments, the methods include determining, by a computing device processor, that two or more of the images have similar key attributes. In some embodiments, the methods include superimposing, by a computing device processor, at least a portion of a first image of the two or more images over at least a portion of the second image of the two or more images. In some embodiments, the methods include comparing, by a computing device processor, the first image and second image. In some embodiments, the methods include determining, by a computing device processor, whether the first image and the second image are identical based on the comparison.

In some embodiments of the methods, the first image and the second image comprise financial records. In other embodiments, the key attributes comprise check numbers, amounts, payors, payees, dates of the financial records, routing numbers, or account numbers. In further embodiments, the methods further include determining, by a computer device processor, that the first image and the second image are identical and discarding at least one of the images based on one or more sources of the first image and the second image, image quality of the first image and the second image, or receipt date of the first image and the second image.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIG. 7 illustrates an exemplary template and images of financial records in accordance with various embodiments;

FIG. 9 illustrates exemplary images of financial records in accordance with various embodiments; and FIG. 10 illustrates exemplary images of financial records in accordance with various embodiments.

DETAILED DESCRIPTION

Figure 1:
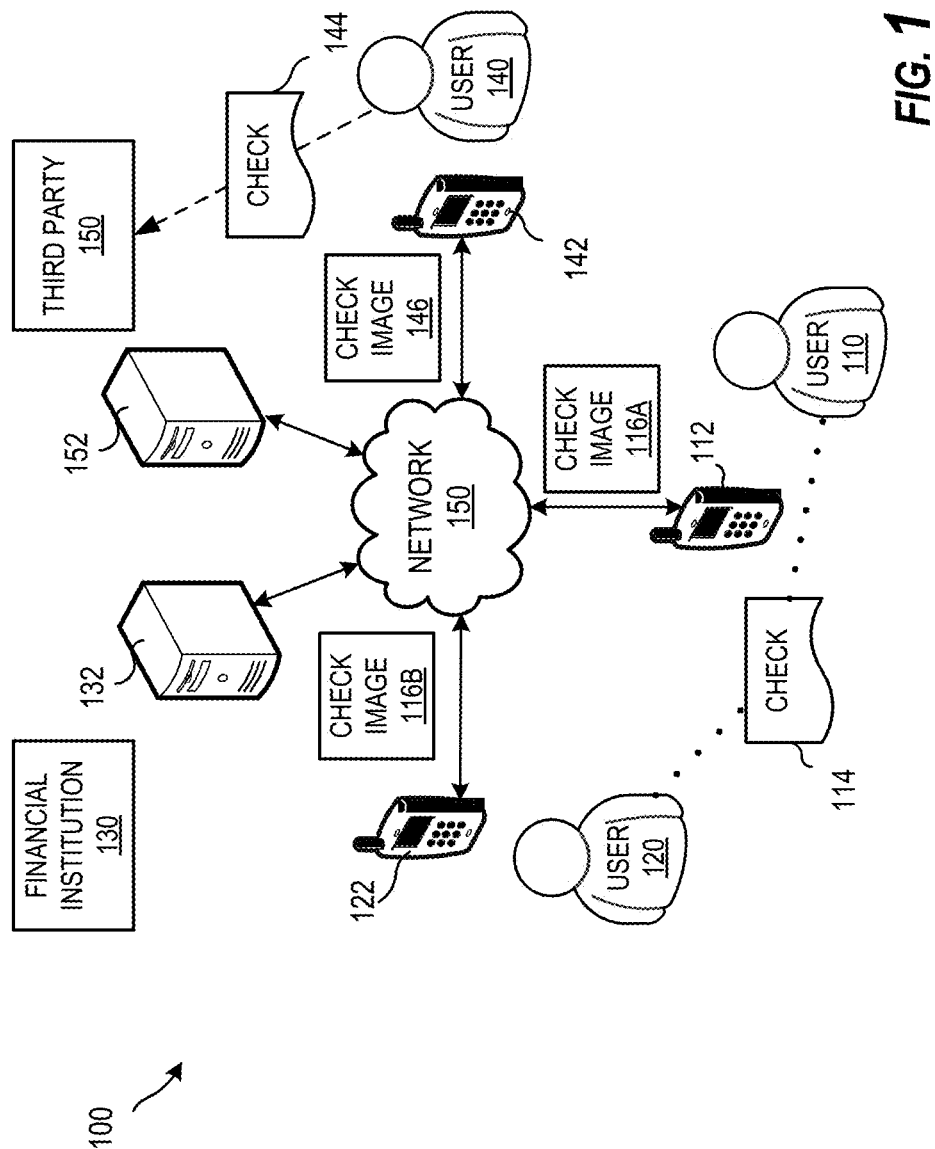
FIG. 1 provides a block diagram illustrating a system and environment for detecting duplicate images.

The embodiments presented herein are directed to systems, methods, and computer program products for detecting duplicate images. In some embodiments, the images include images of check or other financial records captured by an account holder or other entity. In particular embodiments, two or more check images having similar key attributes are determined, and these two or more check images are compared. If the check images are duplicates, they can be stored for further processing. If the check images are not duplicates, at least one of the check images can be discarded or undergo additional processing. In this way, processing and analysis of financial records is made more efficient by removing duplicate record images from financial operations and reducing storage space. Duplicate detection can also be used to enhance security and customer satisfaction through corrections, adjustments, or further processing of check images.

The embodiments of the disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments that detect duplicate images, and that analyze, process, archive, and distribute financial records are provided. As used herein, the term "financial record" refers to, but is not limited to records associated with financial record data, account data, government data, legal data, identification data, and the like. Exemplary financial records include legal documents, wills, court papers, legal memorandum, leases, birth certificates, checks, receipts, contracts, loan documents, financial statements, bills, and the like. Although the disclosure is directed to financial records, it will be understood that non-financial records such as social communications, advertising, blogs, opinion writing, and the like may also be applicable to the disclosure presented herein. In cases were non-financial records are use, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety formats including, paper records, electronic or digital records, video records, audio records, and/or combinations thereof.

Referring now to the figures, FIG. 1 provides a block diagram illustrating a system and environment 100 for detecting duplicate check images. The system 100 includes a first user 110, a second user 120, a financial institution 130, a third user 140, and a third party 150. In some embodiments, a user includes an individual or entity associated with an image or a financial record. For example, the user includes image owners, account holders, entities authorized to write checks or contribute to the financial record, financial institution customers, merchant customers, purchasers, parties to the financial record, and the like. In the illustrated embodiment, the user 110 is an account holder who issues a paper check 114. Although a paper check and check image are illustrated in FIG. 1, it will be understood that any financial record or format of a financial record may be used. Also included in the environment 100 is a capture device 112 of the user 110, a capture device 122 of the user 120, a capture device 142 of the user 140, a financial institution system 132, and a third party system 152, which are operably connected via a network 150.

As shown in FIG. 1, the user 110 uses the capture device 112 to capture an image of the check 114 to produce check image 116A. In the illustrated embodiment, the capture device 112 is a mobile device such as smart phone that includes a camera. It will be understood, however, that the capture device 112 can include any type or number of devices for capturing images or converting the check 114 to any type of electronic format such as a camera, personal computer, laptop, notebook, scanner, and/or other device. In some exemplary embodiments, the user 110 takes a picture of the check 114 at a point of sales or an automated teller machine (ATM) and communicates the resulting check image 116A to a point of sales device or ATM via wireless technologies, near field communication (NFC), radio frequency identification (RFID), and other technologies. In other examples, the user 110 uploads or otherwise sends the check image 116A to the merchant via email, short messaging service (SMS) text, a web portal, online account, mobile applications, and the like. For example, the user 110 may upload a check image to deposit funds into an account or pay a bill via a mobile banking application using the capture device 112.

Additionally, the user 120, in some embodiments, has access to the check 114 and also captures an image of the check 114 using the capture device 122 to create check image 116B. In some embodiments, the check image 116B is sent from the capture device 122 to the financial institution system 132. For example, the user 120 may be an agent or other representative of the user 110 (or vice versa), a joint account holder 120, a family member of user 110, and the like. In one specific example, the user 120 and user 110 are joint account holders, and each may separately captures an image of the same check (i.e., check 114) for online deposits. In other examples, the user 120 may be unassociated with or unknown to the user 110. In such situations, the user 120 may mistakenly or intentionally capture an image of the check 114 and send it to the financial institution system 132 or the third party system 152.

Also included in environment 100 is the user 140. In some embodiments, the user 140 sends a paper check 144 to the third party 150. The third party 150 includes, for example, a third party financial institution, a merchant, a business, and the like. In the illustrated embodiment, the user 140 captures an image 146 of the check 144 using the capture device 142 and mistakenly or intentionally sends it to the third party system 152 or the financial institution system 132. For example, the user 140 may mistakenly or intentionally seeks to deposit or otherwise process the check 144 online and at a physical location associated with the third party 150.

Figure 2:
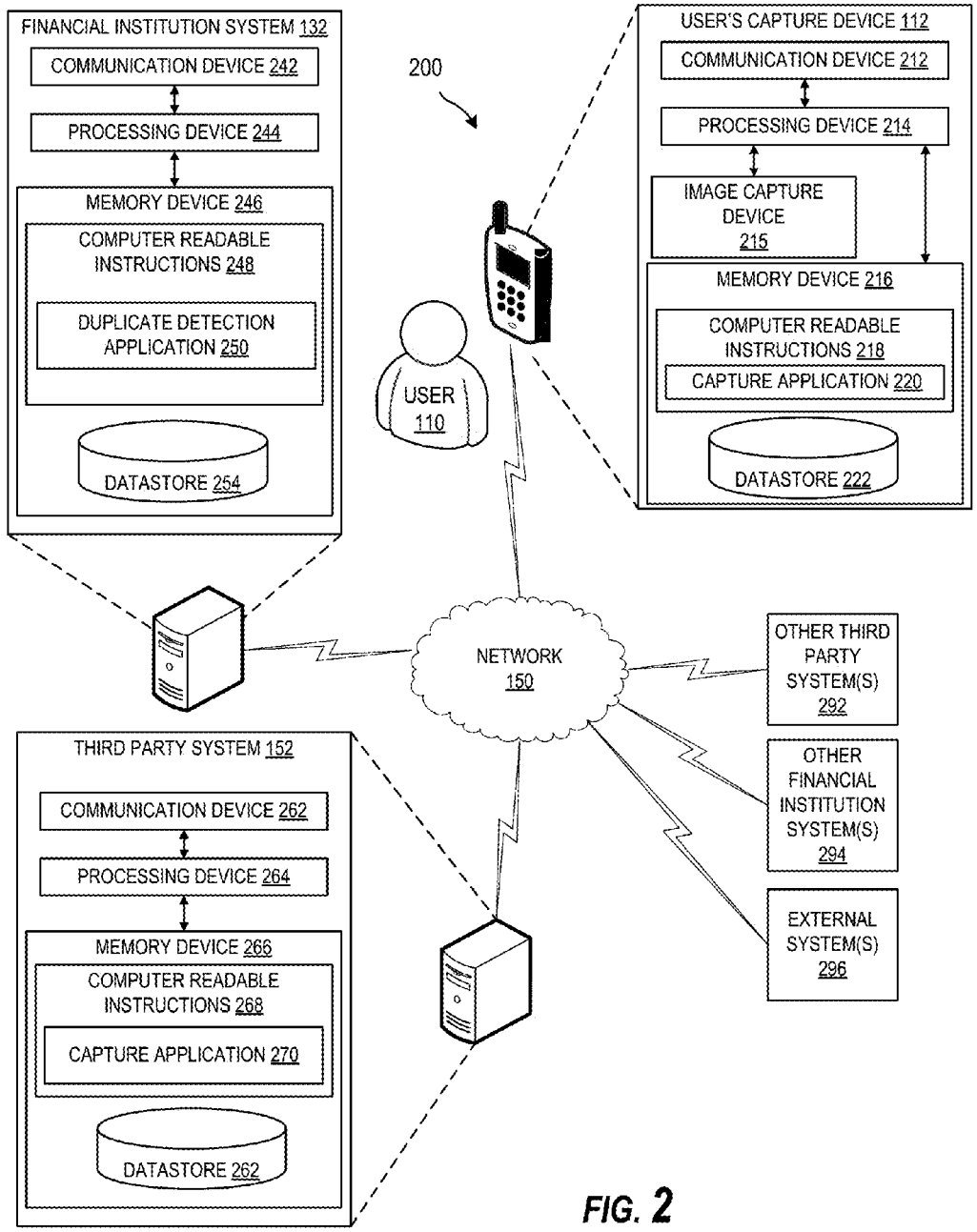
FIG. 2 provides a block diagram illustrating the financial institution system, the third party system, and the user capture device of FIG. 1, in accordance with various embodiments.

Referring now to FIG. 2, a block diagram illustrates an environment 200 for detecting duplicate images. The environment 200 includes the capture device 112, the third party system 152, and the financial institution system 132 of FIG. 1. The environment 200 further includes one or more third party systems 292 (e.g., a partner, agent, or contractor associated with the third party 150 and/or the financial institution 130), one or more other financial institution systems 294 (e.g., a credit bureau, third party banks, and so forth), and one or more external systems 296. The systems and devices communicate with one another over the network 150 and perform one or more of the various steps and/or methods according to embodiments of the disclosure discussed herein. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The capture device 112, the third party system 152, and the financial institution system 132 each includes a computer system, server, multiple computer systems and/or servers or the like. The financial institution system 132, in the embodiments shown has a communication device 242 communicably coupled with a processing device 244, which is also communicably coupled with a memory device 246. The processing device 244 is configured to control the communication device 242 such that the financial institution system 132 communicates across the network 150 with one or more other systems. The processing device 244 is also configured to access the memory device 246 in order to read the computer readable instructions 248, which in some embodiments includes a duplicate detection application 250. The memory device 246 also includes a datastore 254 or database for storing pieces of data that can be accessed by the processing device 244.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user's capture device 112 includes a communication device 212 and an image capture device 215 (e.g., a camera) communicably coupled with a processing device 214, which is also communicably coupled with a memory device 216. The processing device 214 is configured to control the communication device 212 such that the user's capture device 112 communicates across the network 150 with one or more other systems. The processing device 214 is also configured to access the memory device 216 in order to read the computer readable instructions 218, which in some embodiments includes a capture application 220. The memory device 216 also includes a datastore 222 or database for storing pieces of data that can be accessed by the processing device 214.

The third party system 152 includes a communication device 262 and an image capture device (not shown) communicably coupled with a processing device 264, which is also communicably coupled with a memory device 266. The processing device 264 is configured to control the communication device 262 such that the third party system 152 communicates across the network 150 with one or more other systems. The processing device 264 is also configured to access the memory device 266 in order to read the computer readable instructions 268, which in some embodiments includes a capture application 270. The memory device 266 also includes a datastore 262 or database for storing pieces of data that can be accessed by the processing device 264.

In some embodiments, the capture application 220 and the capture application 270 interact with the duplicate detection application 250 to receive or provide financial record images and data, modify financial record data, and analyze financial record data.

The applications 220, 250, and 270 are for instructing the processing devices 214, 244 and 264 to perform various steps of the methods discussed herein, and/or other steps and/or similar steps. In various embodiments, one or more of the applications 220, 250, and 270 are included in the computer readable instructions stored in a memory device of one or more systems or devices other than the systems 152 and 132 and the user's capture device 112. For example, in some embodiments, the application 220 is stored and configured for being accessed by a processing device of one or more third party systems 292 connected to the network 150. In various embodiments, the applications 220, 250, and 270 stored and executed by different systems/devices are different. In some embodiments, the applications 220, 250, and 270 stored and executed by different systems may be similar and may be configured to communicate with one another, and in some embodiments, the applications 220, 250, and 270 may be considered to be working together as a singular application despite being stored and executed on different systems.

In various embodiments, one of the systems discussed above, such as the financial institution system 132, is more than one system and the various components of the system are not collocated, and in various embodiments, there are multiple components performing the functions indicated herein as a single device. For example, in one embodiment, multiple processing devices perform the functions of the processing device 244 of the financial institution system 132 described herein. In various embodiments, the financial institution system 132 includes one or more of the external systems 296 and/or any other system or component used in conjunction with or to perform any of the method steps discussed herein. For example, the financial institution system 132 may include a financial institution system, a credit agency system, and the like.

In various embodiments, the financial institution system 132, the third party system 152, and the user's capture device 112 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Figure 3:
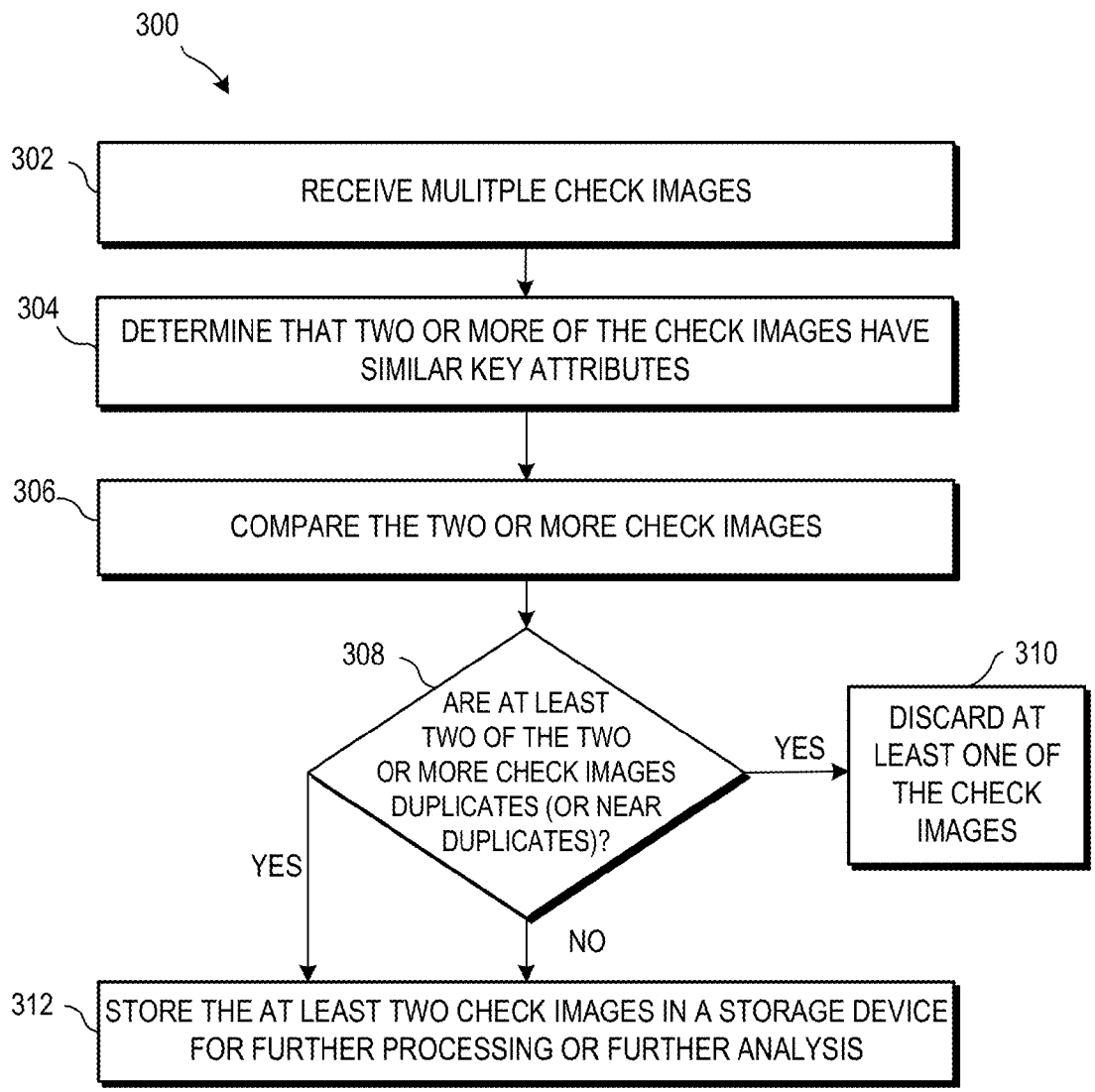
FIG. 3 is a flowchart illustrating a system and method for detecting duplicate images in accordance with various embodiments.

FIG. 3 illustrates a flowchart providing an overview of a process 300 for detecting duplicate images. One or more devices, such as the one or more capture devices and/or one or more other computing devices and/or servers of FIG. 1 and FIG. 2, can be configured to perform one or more steps of the process 300 or process 400 described below. In some embodiments, the one or more devices performing the steps are associated with a financial institution. In other embodiments, the one or more devices performing the steps are associated with a merchant, business, partner, third party, credit agency, account holder, and/or user.

As illustrated at block 302, multiple check images are received. The multiple check images comprise the entire front portion of a check, the entire back portion of a check, or any other portions of a check. In cases where there are several checks piled into a stack, the multiple check images may include, for example, at least a portion of each of the four sides of the check stack. In this way, any text, numbers, or other data provided on the side of the check stack may also used in implementing the process 300.

In some embodiments, each of the multiple check images comprises financial record data. The financial record data includes dates of issuance of financial record, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like.

Although check images are illustrated in FIG. 3, it will be understood that any type of image (e.g., photographs with or without letters, numbers, and the like) or financial record may be received in accordance with the embodiments of FIG. 3. At least a portion of the check image, in some embodiments, is received from a financial institution, a merchant, a signatory of the financial record (e.g., the entity having authority to endorse or issue a financial record), and/or a party to a financial record. In other embodiments, the multiple check images are received from account holders, joint account holder, agents of account holders, family members of account holders, financial institution customers, payors, payees, third parties, and the like. In some embodiments, the source of at least one of the multiple checks includes an authorized source such as an account holder or a third party financial institution. In other embodiments, the source of at least one of the multiple checks includes an unauthorized source such as an entity that intentionally or unintentionally deposits or provides a check image to the system of process 300.

As illustrated at block 304, it is determined that two of more of the check images have similar key attributes. The key attributes include, for example, check numbers, amounts, payors, payees, dates, micro line numbers, routing numbers, account numbers, addresses, check manufacturer, endorsement numbers, internal categorization codes, watermarks, check format, check layout, image quality, color saturation, pixel quantity, and the like. In some embodiments, the similar key attributes comprise one or more identical key attributes. In exemplary embodiments, the key attributes of the two are more check images are determined to be similar utilizing algorithms, operators, or programs that include frequency image data, image hashing and fingerprinting techniques, data matching and threshold calculations, hash value comparisons between images, and the like. For example, an algorithm may compare the perceptual hashes of two images to determine if the bit difference between the two hashes is above a preset level.

As illustrated at block 306, the two or more check images are compared. In some embodiments, the number, frequency, or type of similar key attributes is used to determine whether or not to compare the two or more check images. For example, if four separate check images each has more than 10 similar key attributes, each may be identified and compared to one another. In further examples, if three of the four separate check images have 5 or more of the same types of similar key attributes, those three check images may be compared and the other ignored. In still other embodiments, the two or more checks that have similar key attributes are compared to other financial records or images thereof. For example, the two or more check images may be compared to previously received or processed checks or check images associated with the same account number or account holder, or the two or more check images may be compared to a lease agreement, mortgage application, and other types of financial records that are associated with the payor or payee of the two or more check images. The two or more check images and the other financial records may be compared to verify or correct signatures, spellings, dates, account numbers, amounts, terms of an agreement, and the like.

The comparison of the two or more check images is automatic and/or manual. As discussed in more detail with regard to FIG. 4, the comparison of the two or more check images includes, in some embodiments, overlaying (e.g., superimposing) check images. In such cases, an algorithm can be used to detect any differences and/or similarities in the superimposed images. In other embodiments, the comparison is done side-by-side. For example, a reviewer may examine two check images to determine if they check images are duplicates, near duplicates, or non-duplicates. As used herein, the term "duplicates" includes, but is not limited to identical images/portion of images or substantially similar images/portions of images. The substantially similar images include, for example, images that have some common elements, but that are not identical in image quality (e.g., pixel count, color saturation, focus, alignment, text orientation, text offset, and so forth) file data (e.g., file name, file size, encryption, file security features, and so forth) or financial record data. For example, substantially similar check images or near duplicates may have identical financial record data, but have a different white space background, position of markings, text color, and the like due to image capture techniques, lighting, digital image manipulation or editing, difference in capture devices, check position during image capture, and so forth. In still other embodiments, a hashing algorithm is used to determine if the bit different between hash values of two or more images are above or below a preset level that is indicative of duplicates. For example, if the bit difference is above an X value, the difference may be considered to be too great for the images to be duplicates. If the bit difference is below the X value, the images may be determined to be duplicates. The preset level may be based on certain check image elements such as the types of markings in the check images, the number of markings in the check images, the position of the markings, the financial record data of the check images, and so forth.

As illustrated at decision block 308, it is determined whether or not at least two of the two or more check images are duplicates or near duplicates. If the at least two check images are duplicates or near duplicates, as illustrated at block 310, at least one of the check images is discarded. In some embodiments, determining to delete the at least one check images is based on image criteria, which include the check processing channels, types of check requests, date of receipt of the check image, the image file creation date, the source of the image, the image quality, and/or the image file data. For example, the duplicate image that has the oldest receipt date may be stored and images with a later receipt date may be discarded. In other examples, the image with the best image quality is saved and the all other duplicate check images discarded. For example, the two or more images may be compared and based on a certain quality threshold, one or more duplicate check that meet or exceed the threshold may be stored and those that do not meet the quality threshold may be discarded. In additional examples, check images received at a point of sales may be kept and check images received via an ATM may be deleted. Also, check images that are captured by the payee of the check and sent to the payor and/or exchanged or manipulated by a certain number of authorized entities may be stored while less involved duplicates or near duplicate may be discarded. In this way, check images that have been reviewed and received by the greatest number of entities are preserved such that the chances of missing data or misappropriation of financial record data are diminished. In other cases, where a check image has been received or manipulated by one or more unauthorized users, such a check image may be discarded regardless of the number of authorized or unauthorized entities involved with the check image.

In still other embodiments, the number of the at least one duplicate or near duplicate check images to be stored or discarded is based on the image criteria. If two duplicate checks are received from different sources, for example, they both may be stored for further investigation. In such cases, a determination as to which source is authorized may be determined or the account holder of the check may be sent a notification. If the IP address of the source device is associated with the account holder, for example, then the check image sent from that source device may be retained and the other discarded. If both sources are not associated with the account holder(s), or if the sources are unknown, the account holder may be asked for input to determine which check image to keep and which to discard. In other examples, the check with the oldest or latest receipt date and/or the check with highest image quality may be retained. In additional or alternative embodiments, the at least one duplicate or near duplicate check image is not discarded. For example, the at least two or more check images may be retained and simply removed from further processing.

As illustrated at block 312, the at least two checks are stored in a storage device (e.g., the datastore 254 of FIG. 2) for further processing or further analysis if the at least two check are determined to be non-duplicates or not near duplicates. In other embodiments, as further illustrated in FIG. 3, the at least two checks are stored in a storage device for further process or further analysis even if that at least two check are determined to be duplicates or near duplicates. For example, the at least two checks may be stored so that they can later be adjusted, corrected, sorted, archived, provided to a recipient upon request, cleared, approved, endorsed, and the like. It will be understood that rules or a series of rules can be used to formulate the appropriate course of action (i.e., adjustments, correction, notifications, and so forth).

In some embodiments, the at least two check images (duplicates or non-duplicates) are stored for further processing or further analysis based on the source of the check images. If it is determined that one or more of the at least two check images came from a customer of a financial institution or account holder, for example, the at least two check images may be adjusted and/or the account holder notified. In some cases, some of the at least two check images may be deleted from the account holder's online account such that only one check image is provided to the account holder. In other cases, the check image itself may be modified. For example, a check number, endorsements, time stamps, and the like may be added to a check image that is missing such information. If it is determined that the source of the one or more of the at least two check images is a third party bank, for example, any adjustments or notifications may be implemented via a bank adjustment system. In some embodiments, the system of FIG. 3 is in communication with the bank adjustment system. In other embodiments, the system of FIG. 3 includes the bank adjustment system. Based on source and risk there may be reason to notify and store image duplicates if there are certain profile indicators, for example, 50 duplicates overlay matches from a check cashing company in one day may require further processing.

In additional embodiments, the at least two checks are stored for further analysis to determine the reasons for the differences (if any) in the at least two check images. If all data fields or data in the check images are identical except for the signature portion or the check number, for example, then the at least two checks may be further investigated to determine if the differences are oversights or intentional deviations. The account holder, payee, or payor associated with the check image may be contacted or provided with a notification to affirm the validity of the two checks and to ensure that there are no mistakes. In other embodiments, the at least two checks are stored for further analysis to determine the reasons for the duplicates. If it is determined the reason for the duplicates is due to system error, for example, an internal correction system may be used for correction.

Figure 4:
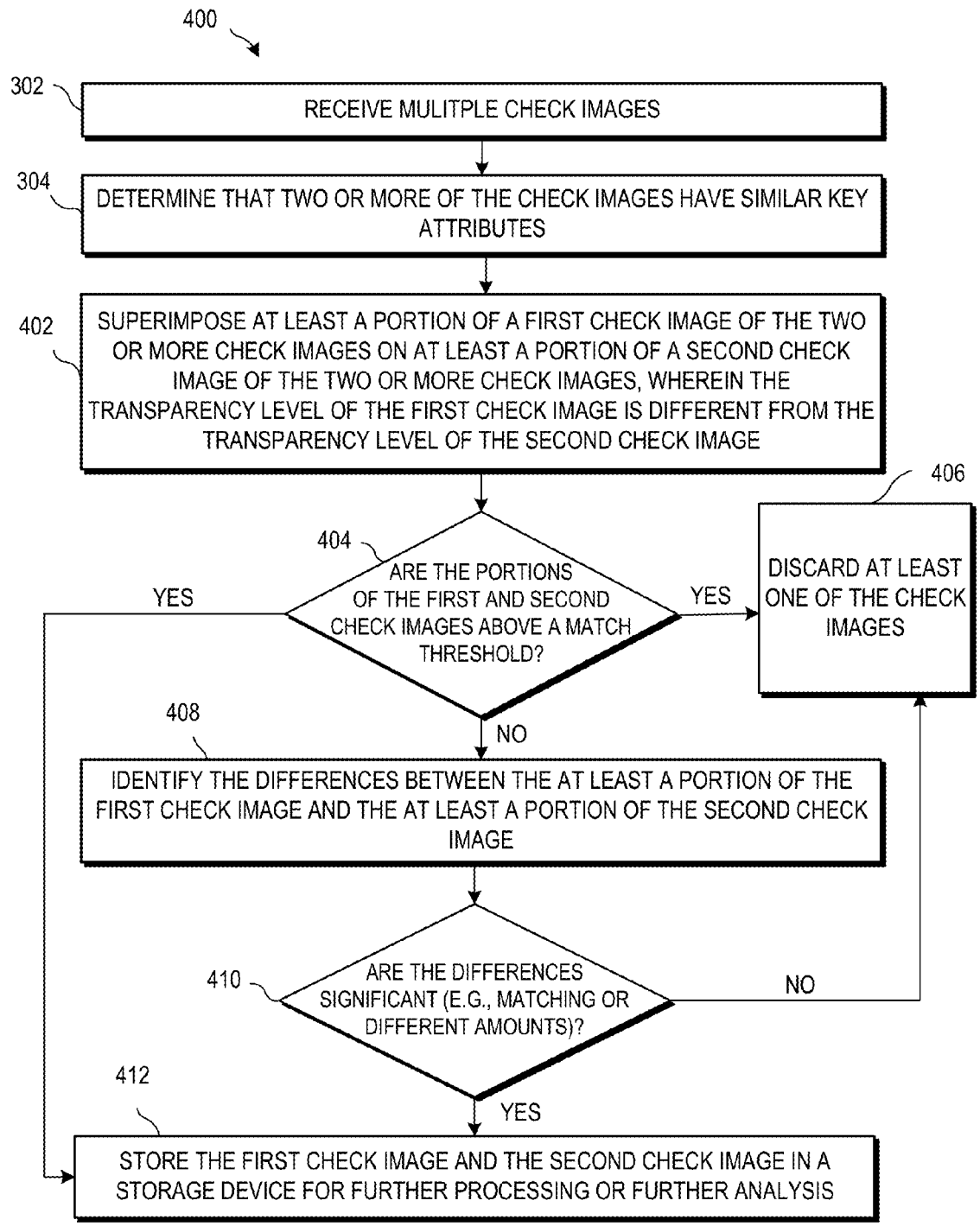
FIG. 4 is a flowchart illustrating a system and method for detecting duplicate images in accordance with various embodiments.

Referring now to FIG. 4, a process 400 for detecting duplicate images is illustrated in accordance with some embodiments of the disclosure. As illustrated at block 302 and as discussed above, multiple check images are received. Although the illustrated embodiment is directed to checks, it will be understood that any type of financial record or other type of image can be used in the process 400. The multiple check images are received, in some embodiments, from at least one of an account holder, the person authorized to sign the checks, a financial institution, a merchant, a party associated with the checks, a payee, and/or a payor. In additional embodiments, the check images are associated with one or more different checks or a single check. Also, the check images may include at least one image of the front of the one or more checks and at least one image of the back of the one or more checks. As illustrated at block 304 and as discussed above, it is determined that the two or more of the check images have similar key attributes.

As illustrated at block 402, at least a portion of a first check image of two or more check images is superimposed or overlaid on at least a portion of a second check image of the two or more check images. In some embodiments, the transparency level of the first check image is different from the transparency level of the second check image (see also, e.g., FIG. 8). For example, the transparency level of the first check image may be higher (e.g., more opaque) that the transparency level of the second check image. In additional or alternative embodiments, at least a portion of the first check image and second check image are overlaid on a check template (see, e.g., FIG. 7). Although the process 400 in FIG. 4 is directed to superimposing only two images, it will be understood that any number of images may be superimposed.

In some examples, a comparison analysis of the entire first check image and the entire second check image may be conducted for only some portions of the check. For example, only specific data fields or areas such as the address, the memo line, the amount box, the payor line, the routing and account number, and the like may be compared when the checks are overlaid, while other non-data aspects of the first and second check images are disregarded in the comparison analysis. In instances where the second check image has a stain or tear on the non-data portions of the check (e.g., white space), any differences or similarities between the first and second check images may be ignored. In other embodiments, all aspects of the images are compared.

In still other embodiments, only some aspects of the first and second check images are compared at a time. In some exemplary embodiments, the comparison of various aspects of the first and second check images follows a specific sequence. For example, portions of the check images corresponding to one particular data field may be compared before another data field is compared. In this way, if one of the data field is not substantially identical, the analysis may terminate without having to compare every single aspect of the check images. In other embodiments, the most important aspects of the check are evaluated before less important aspects of the check. For example, the legal amounts (i.e., the text amounts) of the check images may be reviewed before the courtesy amounts (i.e., the numerical amount written in the amount box).

As illustrated at decision block 404, it is determined whether or not the portion of the first check image and the portion of the second check image are above a match threshold. The match threshold includes, for example, a quantity, range, value, or percentage related to pixel/texel quantity, pixel/texel offset, opacity values, color saturation, and the like. If the first check and the second check are identical, for example, the opacity value, pixel offset, or color saturation for each section of the portions can be predicted and used to calculate the match threshold. If the portions of the first and second check images are above the match threshold, the first and second check images are determined to be duplicates or near duplicates. If the portions of the first and second check images are below the match threshold, the first and second check images are determined to be not duplicates or not near duplicates.

As illustrated at block 406, at least one of the check images is discarded if the portions of the first and second check images are above the match threshold. As detailed above, determining whether the first check image or the second check image should be discarded is based, in some embodiments, on the image criteria, which include the check processing channels, types of check requests, date of receipt of the check image, the image file creation date, the source of the image, the image quality, and/or the image file data. In cases where a fatal flaw is determined, both check images may be discarded. For example, if it is determined that both check images are identical or nearly identical to a check that has already been processed, then any subsequently received checks can be deleted or prevented from being further processed. Other examples of the fatal flaws include file image viruses, corruption of the image files, legally non-compliant check data, illegible check data, false check data (e.g., identity misrepresentations), and the like.

In additional or alternative embodiments, a determination to store the first check image and the second image is based on the image criteria even when the first and second check images are determined to be duplicates. As shown in FIG. 4, the first check image and the second check image are stored in a storage device for further processing or further analysis even if the portions of the first check and the second check image are above the match threshold. For example, the at least two checks may be stored so that they can later be adjusted, corrected, sorted, archived, provided to a recipient upon request, cleared, approved, endorsed, and the like.

As illustrated at block 408, the differences between the at least a portion of the first check image and the at least a portion of the second check image are identified. In some embodiments, the differences are identified based on the respective portions of the first and second check images. For example, if the respective portions are located in certain areas of the check or correspond to certain data fields, the differences can be identified as certain types of data such as "category of payment" or "reason for payment" if the portions correspond to the memo line, an amount if the portions correspond to the amount box, and so forth.

In other embodiments, the differences are identified based on the type of marking in the portions of the first and second check images. The markings include, for example, text, numbers, symbols, other characters, lines, shadows, shapes, ink blots, stains, watermarks, any visible marking on the paper check, any visible marking applied electronically to the check image, or any pixel/texel quantity thereof. If the first check image has letters and numbers in the portion of the first check corresponding to the date and the second check image has only numbers, then the system of process 400 can determine that the difference is in the format of the date (e.g., "9 May" versus "5/9") or the dates themselves (e.g., "9 May" versus "05-05").

In additional embodiments, the differences are identified based on the position of the markings in the portions of each of the first and second check images. In some embodiments, the portions of the first and second check images are positioned in different and/or separate areas of the check. In such cases, the markings may be identical or similar but in different areas of the checks, or the marking may be different and in separate areas of the checks. In instances where the markings are identical but the portions of the first and second check images are positioned in different and separate areas of each respective check, the system of process 400 can determine that the reason for the disparity such as misalignment of the check when the check image was captured, creases in the paper check itself that cause misalignment of the marking in one of the check images, image manipulation, paper manipulation, and so forth. In instances where the markings are different and the portions first and second check images are also different, the system of process 400 can determine the reasons for the disparity to be, for example, later added markings such as a smudge on the left corner of the second check image that does not appear in the first check image or an endorsement on the back of the first check image and not on the second check image. In other embodiments, the differences between the first and second check images are included in the same portions of the first and second check images. In some examples, the signatures in the endorsement areas of the first and second check images may be identical, but the position of the signatures within the endorsement areas may be different. The signature in the first check image may be positioned 3 centimeter from the starting point of the signature line, while the signature of the second check image may be positioned 5 centimeters from the starting point. Also, the signature of the first check image may be above the signature line and the signature of the second check image may be below the signature line. In other instances, the signatures or other data may be positioned in the same place within the portions of the first and second check image, but may not be identical The differences may be attributable, for example, to the angle of the paper check or capture device when the image was captured, electronic formatting of the check images, creases in the paper check as discussed above, and so forth. In other examples, the differences may be attributable to mistaken reproductions, misrepresentations by the sender of the check, and so forth.

As illustrated at decision block 410, it is determined whether the differences are significant or insignificant. The determination of the significance of the differences, in some embodiments, is based on the identified data differences, the types of markings, or the position of the markings and the portions of the first and second check images.

Identified data differences, in some embodiments, are determined to be significant or insignificant based on amounts, account numbers, type of account, dates of the checks, signatures, the payor, the payee, check numbers, and the like. For example, if the amounts on the checks are less than $100 or if the account number corresponds to a temporary account, the differences between the portions of the first and second check images may not be considered to be significant. In such cases, at least one of the check images can be discarded (see block 406). In other examples, if the dates of the first and second check images date back more than a year, both checks may be discarded because the checks may no longer be valid. In still other examples, any detected difference in the check data is considered to be significant.

In other embodiments, whether or not the identified differences between the portions of the first and second check images are significant is based on the types of markings. For example, markings that do not correspond to the alphabet, numbers, punctuation, trademarks, logos, or any other established or authorized character, may be considered to be insignificant. Check images that have streaking, lighting glares, ink blots, paper tears, paper smudges, markings resulting from obtrusion on the lens of a camera or scanner, characters that have poor image quality (e.g., text that is illegible or blurry text) and the like can be discarded (see, block 406). In other examples, any marking that obstructs the key attributes or certain elements of the check such as the date, the payer, the payee, and so forth are considered to be significant such that both check images are stored and/or further processed (see, block 412). In additional examples, differences in established or authorized characters (e.g., recognizable letter, numbers, punctuation, and the like) may be considered to be significant if the established characters correspond to a certain image quality or if the established characters are not identical. For example, if the time stamp on the first check image is 10:01 and the time stamp on the second check image is 12:17, such differences in the time stamps can be considered to be significant. In still other embodiments, whether or not the identified differences between the portions of the first and second check images are significant is based on the position of the markings in the portions of the first and second check images. As detailed above, detected differences in the positioning of the markings can be due to physical differences in the first and second checks when the images were captured, faulty capture device, faulty capture techniques, and so forth. In such cases, the differences may be considered to be significant or insignificant.

In still other embodiments, detected differences that are unintentional or a mistake are determined to be insignificant and differences that are intentional and not a mistake are determined to be significant. For example, an account holder may intentionally upload a check image that includes an endorsement signature on the back of the check via his or her online banking account even though they may have already deposited the same check without the signature during the previous week. In such cases, the system of process 400 may notify the account holder and determine that the later received check image was a mistake made by the account holder. In other cases, an unauthorized party may upload a check image that has been manipulated to include a different account number from the account number of an original check image associated with an authorized party. In this example, the differences between the manipulated check image and the original check may be determined to be significant.

As illustrated at block 406, at least one of the check images is discarded if the differences are determined to be insignificant as described hereinabove. It will be understood that the process of 400, including the step at block 406, can be rule driven. The rules can be used at a granular level to determine all thresholds and fields for determining whether images should be discarded, adjusted, or further processed depending on the variation and types of similarities or dissimilarities associated with the images.

As illustrated at block 412, the first check image and the second check image are stored in a storage device for further processing or further analysis if the differences are determined to be significant. For example, the first and second check images may be stored so that they can later be sorted, archived, provided to a recipient upon request, cleared, approved, endorsed, and the like. In some embodiments, an account holder, payor, payee, or third party financial institution is contacted for input or provided with a notification. For example, joint account holders may be contacted to determine if both account holders submitted the same check or a third party financial institution may be contacted to determine if a duplicate check has previously been deposited. In other embodiments, the first check image and/or second check image is corrected. If an account holder, for example, verifies that the check number, payor, or amount associated with the second check image is incorrect, appropriate correction may be undertaken. For example, a business may have issued two checks at the same time on the same day and accidentally placed the same check number on two different checks.

Differences in certain types of data, such as signatures and amounts above a certain predetermined amount, can result in further analysis. In other examples, if an account is temporary or if the account on the check corresponds to a joint account or a business account, differences in signatures may not result in a misappropriation investigation due to the amount of time the funds in the account are available or the number of possible people who may have authority to sign the checks. Instead, the source of such check images may simply be contacted to determine appropriate action. In other embodiments, previous transactions associated with the accounts of the first and second check images and previous transactions associated with the account holder, payor, or payee can be used to determine if and when further processing or analysis is needed. In further embodiments, certain check images require different processing times and priorities. For example, if the first check image was received for a deposit on a mobile banking application and the second check image was received at a teller for cash withdrawal, further analysis/processing may be required immediately. Check images with longer processing times may be given a low priority even if such check are received at an earlier time than check images that are received at a later time.

Figure 5:
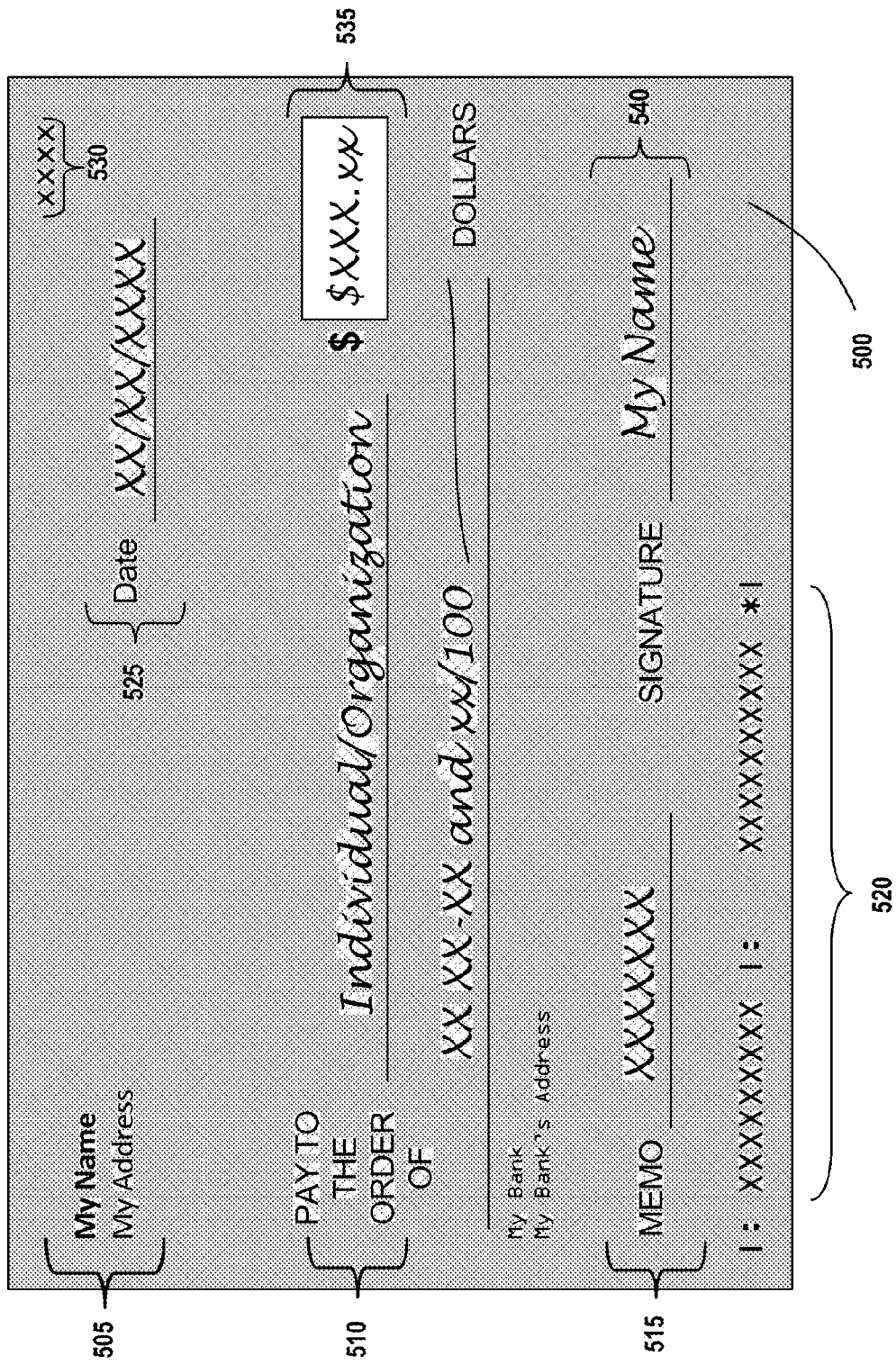
FIG. 5 illustrates an exemplary image of a financial record in accordance with various embodiments.

Referring now to FIG. 5, an exemplary image of a check 500 is illustrated. The image of check 500 may comprise an image of the entire check, a thumbnail version of the image of the check, individual pieces of check information, all or some portion of the front of the check, all or some portion of the back of the check, or the like. Check 500 comprises check information, wherein the check information comprises contact information 505, the payee 510, the memo description 515, the account number and routing number 520 associated with the appropriate user or customer account, the date 525, the check number 530, the amount of the check 535, the signature 540, or the like. In some embodiments, the check information may comprise text. In other embodiments, the check information may comprise an image. A capture device (e.g., the user's capture device 112 of FIGS. 1-2) may capture an image of the check 500 and transmit the image to a system of a financial institution (e.g., the financial institution system 132 of FIGS. 1-2) via a network. The system may collect the check information from the image of the check 500 and store the check information in a datastore (e.g., the datastore 254 of FIG. 2). In some embodiments, the pieces of check information may be stored in the datastore individually. In other embodiments, multiple pieces of check information may be stored in the datastore together. In some embodiments, the pieces of check information may be stored in the datastore immediately following the capture of the image of the check 500. In other embodiments, the pieces of check information may be stored in the datastore at a predetermined point in time after the image of the check 500 has been captured. The entity may reserve the right to determine the point in time in which the check information is stored in the datastore. In some embodiments, the check information may be captured or stored in the datastore at a lower resolution than the original image of the check. In other embodiments, the check information may be captured or stored in the datastore at a higher resolution than the original image of the check. In some embodiments, the check information may be captured or stored in the datastore at a reduced size. In other embodiments, the check information may be captured or stored in the datastore at an increased size.

Figure 6:
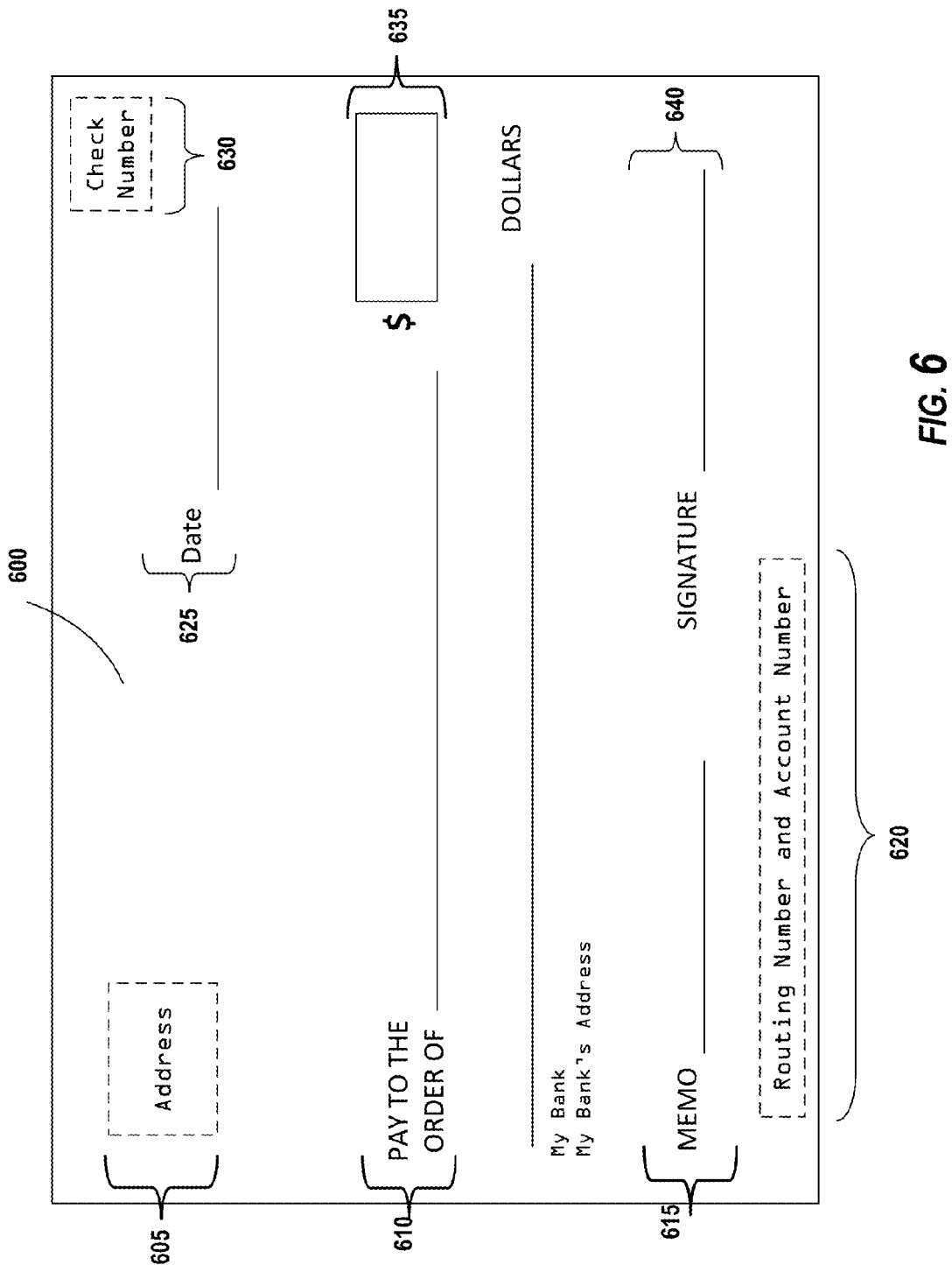
FIG. 6 illustrates an exemplary template of a financial record in accordance with various embodiments.

Referring now to FIG. 6, a check template 600 illustrated. In the illustrated embodiment, the check template 600 corresponds to the entire front portion of a check, but it will be understood that the check template 600 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system of process 300, 400, or any other system can "learn" to map the key attributes of the check for faster and more accurate processing. In some embodiments, financial records are categorized by template. The check template 600 is only an exemplary template for a financial record, and other check templates or other financial record templates may be utilized to categorize checks or other financial records.

The check template 600 comprises check information, wherein the check information includes, for example, a contact information area 605, the payee line 610, the memo description line 615, the account number and routing number area 620 associated with the appropriate user or customer account, the date line 625, the check number area 630, the amount box of the check 635, the signature line 640, or the like.

Figure 8:
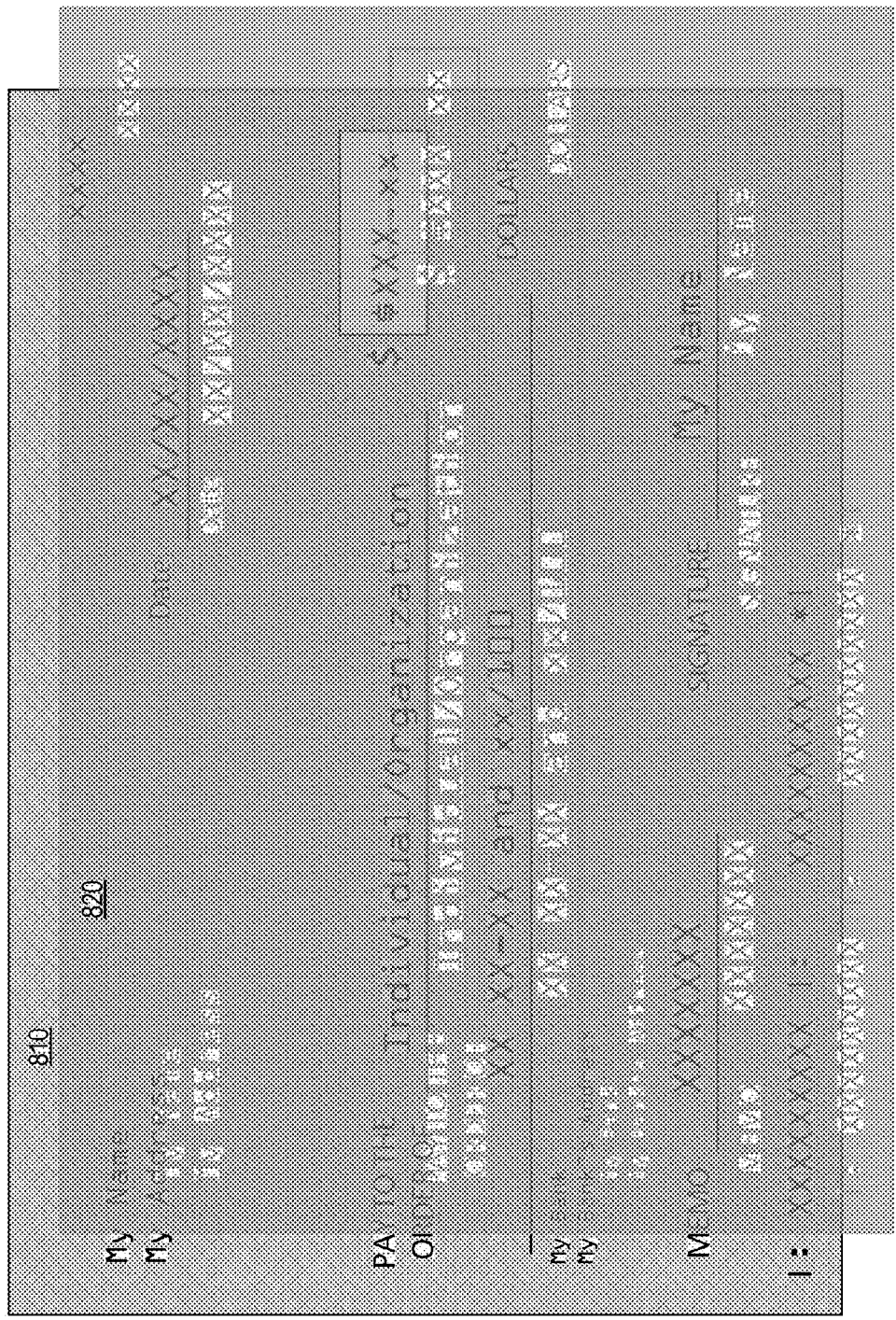
FIG. 8 illustrates exemplary images of financial records in accordance with various embodiments.

As illustrated in FIG. 7, data from a first check image 710 and data from a second check image 720 is overlaid onto the template 600. In the illustrated embodiment, the transparency levels of the first check image data 710 is different from the transparency level of the second check image data 720, however, it will be understood that the transparency levels may be the same. FIG. 8 illustrates an embodiment where a check image 820 is overlaid on top of another check image 810. In the illustrated embodiment, the checks are offset to provide visual clarity. The check image 810 and the check image 820 have different transparency levels. In other embodiments, the check images 810 and 820 have the same opaqueness or transparency level, but have different coloring.

Referring now to FIGS. 9-10, exemplary combination images illustrating various overlay configurations in accordance with embodiments described herein are provided. In FIG. 9, an exemplary combination configuration 910 comprising data from two or more check images is illustrated. In some embodiments, the combination configuration 910 comprises the overlay configuration of FIG. 7 comprising the check template 600, first check image data 710, and second check image data 720. In other embodiments, the combination configuration 910 comprises the overlay configuration of FIG. 8 comprising the check images 810 and 820. As shown in FIG. 9, a difference 920 is provided in the combination configuration 910 corresponding to the payee portions of two or more check images. The difference 920 in the illustrated embodiment comprises different markings, a different position of the markings on the payee line, and different character spacing for each of the two or more check image data. The difference 920 may also include, for example, different font, different color saturation of the markings, different pixel amounts, different focus values (i.e., blurriness or crispness), and the like for each of the two or more check image data. Also provided in FIG. 9 is a second difference 930. In some embodiments, the second difference 930 comprises an additional marking that is included in some of the two or more check images but not in all of the check images. For example, the second difference 930 may include a paper hole, stain, circular stamp, ink blot, or any other type of marking that appears in a signature portion or right, lower corner of a first check image, but not in the same area of a second check image.

FIG. 10 illustrates a combination configuration 1010 comprising data from two or more check images. In some embodiments, the combination configuration 1010 comprises the overlay configuration of FIG. 7 comprising the check template 600, first check image data 710 and second check image data 720. In other embodiments, the combination configuration 1010 comprises the overlay configuration of FIG. 8 comprising the check images 810 and 820. As shown in FIG. 10, all of the markings in the combination configuration 1010 are identical in some aspects and different in other aspects. For example, the font of, the order of, and type of characters of the address, the date, the memo line, and the like may be identical, but the color saturation, pixel values, font size, character spacing, and/or position of the characters are different. As a specific example, the payee names in both of the two or more check images may be the same in terms of letters, font, character spacing and so forth, but the payee name of one check may be blurrier than, bigger in font than, or offset from the payee name of another check.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for detecting duplicate images, the system comprising:
   a computer apparatus including a processor and a memory; and
   a duplicate detection software module stored in the memory, comprising executable instructions that when executed by the processor cause the processor to:
   receive multiple images;
   determine that a first of the multiple images and a second image of the multiple images have similar key attributes;
   retrieve a document template associated with the first image and the second image;
   superimpose the first image and the second image over the document template;
   compare the first image with the second image and the document template;
   identify differences between the first image and the second image relative to the document template, the differences comprising a portion of the first image containing first markings and a portion of the second image containing second markings;
   determine that the portion of the first image and the portion of the second image are positioned in different and separate areas of each of the first image and the second image, wherein the first markings and the second markings are identical; and
   discard at least one of the first image and the second image based on one or more sources of the first image and the second image, image quality of the first image and the second image, or a respective receipt date associated with the first image and the second image.

2. The system of claim 1, wherein the executable instructions further cause the processor to determine that the first image and the second image are identical.

3. The system of claim 1, wherein the executable instructions further cause the processor to:
   determine that the first image and the second image are not identical; and
   store the first image and the second image in a storage device for further processing.

4. The system of claim 1, wherein the first image and the second image comprise financial records.

5. The system of claim 4, wherein the executable instructions further cause the processor to:
   request input from a financial account holder associated with at least one of the first image and the second image.

6. The system of claim 1, wherein the key attributes comprise check numbers, amounts, payors, payees, dates of the financial records, routing numbers, or account numbers.

7. The system of claim 1, wherein a transparency level of the first image is different from a transparency level of the second check image.

* * * * *